United States Patent [19]

Chen

[11] Patent Number: 4,597,916
[45] Date of Patent: Jul. 1, 1986

[54] METHOD OF AND APPARATUS FOR INTERMEDIATE LAMELLA VAPOR LIQUID CONTACT

[75] Inventor: Gilbert Chen, Farmers Branch, Tex.

[73] Assignee: Glitsch, Inc., Dallas, Tex.

[21] Appl. No.: 725,144

[22] Filed: Apr. 19, 1985

Related U.S. Application Data

[63] Continuation of Ser. No. 506,417, Jun. 21, 1983, abandoned.

[51] Int. Cl.$^4$ ............................................. B01F 3/04
[52] U.S. Cl. .................................. 261/94; 29/157 R; 29/163.5 R; 202/158; 261/112; 261/DIG. 72; 428/182; 428/596; 428/597
[58] Field of Search .................................. 261/94–98, 261/100, 112, 114 JP, DIG. 11, DIG. 72; 210/150, 151; 202/158; 29/157 R, 6.1, 163.5 R, 163.5 F; 156/510; 165/166, 60; 55/241; 428/596, 597, 182; 422/211, 222

[56] References Cited

U.S. PATENT DOCUMENTS

| | | |
|---|---|---|
| 2,206,440 | 7/1940 | Walker ............................ 261/112 |
| 2,470,652 | 5/1949 | Scofield ............................ 261/94 |
| 3,013,781 | 12/1961 | Haselden ............................ 261/112 |
| 3,084,918 | 4/1963 | Kohl et al. ............................ 261/112 |
| 3,155,153 | 11/1964 | Axelsson ............................ 261/112 X |
| 3,206,536 | 9/1965 | Goodloe ............................ 29/163.5 R |
| 3,346,246 | 10/1967 | Loetel et al. ............................ 261/112 X |
| 3,417,975 | 12/1968 | Williams et al. ............................ 261/114 JP |
| 3,645,830 | 2/1972 | Warp ............................ 156/510 |
| 3,785,620 | 1/1974 | Huber ............................ 261/112 X |
| 4,238,426 | 12/1980 | Slobodyanik ............................ 261/114 JP |
| 4,296,050 | 10/1981 | Meier ............................ 261/112 |
| 4,356,611 | 11/1982 | Chen et al. ............................ 29/163.5 R X |
| 4,501,707 | 2/1985 | Buhlmann ............................ 261/112 X |

FOREIGN PATENT DOCUMENTS

| | | | |
|---|---|---|---|
| 1283250 | 11/1968 | Fed. Rep. of Germany | 261/112 |
| 2032292 | 4/1971 | Fed. Rep. of Germany | 261/112 |
| 2601890 | 7/1971 | Fed. Rep. of Germany | 261/112 |
| 2060178 | 11/1971 | Fed. Rep. of Germany | 261/112 |
| 843119 | 8/1960 | United Kingdom | 261/112 |
| 1202704 | 8/1970 | United Kingdom | 261/112 |
| 1245938 | 9/1971 | United Kingdom | 261/112 |

Primary Examiner—Richard L. Chiesa
Attorney, Agent, or Firm—Thomas L. Cantrell; Stanley R. Moore

[57] ABSTRACT

Process tower vapor-liquid contact method and apparatus comprising stacks of corrugated contact plates having perforated lamella disposed therebetween. The corrugated plates are disposed in face-to-face contact with respective corrugations inclined to the horizontal and separated one from the other by a perforated sheet. The assembly affords optimal pressure drop characteristics, surficial area, vapor passage area, and vapor-liquid distribution characteristics with maximum efficiency. The sandwiched plate separating adjacent corrugated contact plates greatly increases the mass and heat transfer between the liquid and vapor phases passing thereacross by effectively segregating opposed corrugated channels and establishing a plurality of vapor-liquid contact areas positioned for engaging both vapor and liquid flow in opposed directions through the oppositely inclined corrugations of adjacent plates. In this manner the notional plane is defined between stacks of inclined corrugated contact plates and provided in a configuration providing multiple mass and heat transfer points between adjacent corrugations and the flows directed therethrough wherein the vapor-liquid contact is maximized with a minimum of pressure drop.

14 Claims, 20 Drawing Figures

METHOD OF AND APPARATUS FOR INTERMEDIATE LAMELLA VAPOR LIQUID CONTACT

CROSS-REFERENCE TO RELATED APPLICATION

This application is a continuation of Application Ser. No. 506,417 filed June 21, 1983, now abandoned.

BACKGROUND OF THE INVENTION

1. Field of the Invention

The present invention relates to vapor-liquid contact grids and, more particularly, to corrugated contact plates disposed in face-to-face contact for use in vapor-liquid process towers.

2. History of the Prior Art

In the vapor-liquid contact art, it is highly desirable to utilize methods and apparatus that efficiently improve the quality as well as the quantity of the mass heat transfer occurring in process towers. The technology of such process towers is replete with various material designs used for tower packing. Types of packing are functions of the particular process to be effected within the tower. The packing elements may thus comprise a structured grid array (grid packing) arranged to form a regular array inside the column or may comprise oblique shapes dumped into and randomly arranged (dump packing) within the tower. Close fractionation and/or separation of the feed stock constituents introduced into the tower and the elimination of harmful or undesirable residual elements imparts criticality to the particular vapor-liquid contact apparatus designed. The shape of the dump or grid packing elements determines the flow patterns in and density of the array and the resultant resistance to flow caused thereby. Prior art grid arrays have thus found utility in a variety of shapes, sizes and material forms in both grid and dump packings configurations.

It has been found particularly desirable in the prior art to provide apparatus and methods affording efficient heat transfer, fluid vaporization, or vapor condensing duty whereby cooling of one of the fluids can be accomplished with a minimum pressure drop through a given zone of minimum dimensions. High efficiency, low pressure drop and reduced temperatures are most often found as design criteria in the chemical engineering art as applied to petroleum refraction operations. Process towers for effecting such chemical reactions are generally of the character providing descending fluid flow from an upper portion of the tower and ascending vapor flow from a lower portion of the tower. Sufficient surficial area for vapor-liquid contact is necessary for the primary function and the reduction or elimination of liquid entrainment present in the ascending vapor. Most often it is necessary for the grid array to have sufficient mass and surficial area in both its horizontal and vertical planes so that fractions of the heavy constituents are conducted downwardly in condensed form and the vapors are permitted to rise through the grid with minimum impedence. With such apparatus, undesirable solids or heavy constituents of the feed stock are removed by the coaction of the ascending liquid vapor to provide a self-cleaning grid. A plurality of stacked layers affording compatible and complemental design configurations are generally assembled within a single process column. Each layer utilizes the velocity and kinetic energy of the ascending vapors to perform the dual function of eliminating liquid entrainment in the ascending vapor and the thorough and turbulent contacting of the vapor with the descending liquid to accomplish sufficient separation or fractionation of the fluids into desired components. Quick cooling of the ascending vapor is generally a prerequisite for efficient operation to effect efficient heat transfer for vapor condensation and minimum pressure drop in a minimum vertical depth of the grid. Oppositely inclined corrugated lamella, or plates, have thus been utilized in the prior art for affording multiple vapor passages through the horizontal and vertical planes of the grid layers to insure the flow of vapor and distribution thereof within the lamella and prevent maldistribution, or channeling, of the vapor through certain portion of the layers and not others. Only in this manner is efficient and effective utilization of the column and the energies applied therein effected.

Most often used in the process column prior art is a plurality of layers with grid members of each layer having angularly disposed adjacent elements. Each element generally has a structural configuration and angularity that permits a large upright vapor passage area which is in excess of one-half the horizontal area of the lamella. This design affords acceptable efficiency and vapor-liquid distribution for heat-mass transfer. Such structures also be necessity provide thorough and turbulent mixing or contacting of ascending vapor and descending liquid. This is done without materially displacing either the vapor or liquid from its vertical location within the flow grid. It is important to prevent maldistribution or channeling of either the vapor or the liquid through certain portions of the grid or its layers.

The structural configuration of inclined corrugated contact plates of the prior art variety often incorporate lineal vapor orifice passages. Vapor turbulence is created by such orifices to insure intimate vapor liquid contact. It is also necessary to insure the ascending vapor performs a dual function of liquid contact and liquid disentrainment within close proximity to the vertical location at which the ascending vapor approaches or leaves the vapor passage orifices. In this manner maldistribution of the ascending vapor or descending vapor is prevented. It is, moreover, a tantamount concern of the prior art to provide such methods and apparatus for vapor-liquid contact in a configuration of economical manufacture. Such considerations are necessary for cost effective operation.

Oppositely inclined corrugated plates provide but one method and apparatus for countercurrent, liquid-vapor interaction. With such grid arrays, the liquid introduced at or near the top of the column and withdrawn the bottom is effectively engaged by vapor being introduced at or near the bottom of the column and withdrawn at the top. The critical feature in such methods and apparatus is to insure that the liquid and vapor achieve the desired degree of contact with each other so that the planned reaction occurs at the designed rate within controlled parameters of mass transfer. The internal structure is, of course, passive in the sense that it is not power driven and has few, if any, moving parts. The prior art is thus replete with passive vapor-liquid contact devices utilizing cross-fluted and perforated sheets of material in face-to-face engagement. This configuration encourages the liquid moving through the grid to form itself into films having, in the aggregate, a large area over which the vapor may pass. However, the design problem is not merely a matter of providing a large surface area or a multitude of corrugations, cross-flutes, or perforations. A number of other interrelated design considerations must be taken into account, some of which have been mentioned above.

From a process standpoint, it is important that the desired vapor-liquid contact reaction be carried as close to completion as possible. For example, in a crude oil vacuum tower, close fractionation and good separation are needed to produce gas oil streams that are free of undesirable residual elements. As mentioned above, the contact column and its internal apparatus must efficiently utilize the heat supplied to the unit. In this manner, it minimizes direct operating costs, whether the reaction is mass transfer, heat transfer, liquid-vaporization or vapor condensing duty. With the above, pressure drop is the primary consideration as is the vapor-liquid fluid interface. Such grids for vapor-liquid contact have been shown in the prior art in such references as U.S. Pat. No. 3,343,821, issued Sept. 26, 1967; U.S. Pat. No. 4,139,584, issued Feb. 13, 1979; U.S. Pat. No. 4,128,684, issued Dec. 5, 1978; U.S. Pat. No. 3,785,620, issued Jan. 15, 1974; and U.S. Pat. No. 3,959,419, issued May 25, 1976.

In the above-referenced vapor-liquid contact method and apparatus patents, a plurality of design configurations are presented for affording intimate vapor-liquid contact. In particular, stacked corrugated contact plates in face-to-face contact having corrugations inclined to the horizontal, and/or orthogonal one to the other, have been shown and provided in various material configurations. These configurations include monofilament yarns, and solid plates. It is moreover prominent in the prior art to utilize cross-fluted plates having a myriad of perforations therethrough.

While many prior art methods and apparatus for vapor liquid contact have been shown to be effective, certain disadvantages still remain. In particular, vapor-liquid contact towers incorporating descending liquid flow and ascending vapor flow of the passing grid variety defined above, is generally incapable of self-regulation of internal pressure differentials and the prevention of maldistribution, or non-homogenous, vapor-liquid flow across the grid areas. This is true even with a plurality of aperatures disposed between corrugated and/or cross-fluted plates in face-to-fact contact. Vapor flow is ultimately sensitive to pressure differentials, including laminar flow patterns, and is easily diverted between the myriad of exposed areas of mating corrugations or flutes. Even when the corrugations of adjacent plates are inclined at relatively sharp angles, vapor flowing along any one corrugation is substantially exposed to the adjacent corrugated channels rather than to the film of liquid along wall sections. Vapor-liquid flow in such configurations is thus susceptible to an inefficient, random flow pattern which cannot be accurately determined within the passive grid.

The absence of any substantial degree of flow directionality through surface wall areas within the corrugations decreases the uniformity and homogeniety of the flow pattern throughout the grid along with the programmed turbulence and mass-heat transfer characteristics typical of predefined grid structures with known flow characteristics. Moreover, the notional plane between face-to-face corrugations and/or fluted plates comprises in the main, the largest available planar surface area of any single corrugation section. The surface area is subjected only to vapor flow. This is true because all sheeting of fluid flow must, by definition, be limited to the walled surface area. For this reason, the notional plane of separation between facing corrugations of most prior art structures comprises an area of lost vapor-liquid contact and thus a loss of efficiency in the operation.

It would be an advantage, therefore to overcome the problems of the prior art by incorporating the advantages of face-to-face corrugated and fluted contact plates with utilization of the notional plane of separation therebetween for maximizing efficiency and vapor-liquid contact without adversely effecting the the operational characteristics for adding to pressure losses therethrough. The methods and apparatus of the present invention provide such an improvement over the prior art grid arrays by providing an apertured surface, or plate, disposed along the notional plane between said corrugated plates. In this manner, liquid is permitted to flow both within the corrugations or flutes of facing plates and along the notional separation plane therebetween for substantially increasing the vapor-liquid contact of ascending vapor and descending liquid normally passing between said corrugated planes. The presence of apertures within the sheet also permit flow diversion and the formation of liquid deposits which collect in certain apertures to be exposed on opposite sides thereof directly to vapor flow in opposed directions thereacross. Such liquid vapor flow configurations are in effect maximum utilization of process tower technology and may be afforded with minimal increase in production costs over that of conventional opposed plate corrugation assemblies not incorporating a notional plane separation sheet. Moreover, a variation in the aperture size may further enhance vapor pressure equalization and flow distribution between opposed channels where non-homogeneous flow areas have been created.

SUMMARY OF THE INVENTION

The present invention relates to vapor-liquid contact towers and grid arrays disposed therein for affording vapor-liquid contact. More particularly, one aspect of the present invention comprises an improved tower packing grid of the type comprising a plurality of corrugated sheets in face-to-face contact with opposed corrugations inclined oppositely one to the other. The grid is adapted for receiving a descending liquid flow concomitantly with an ascending vapor flow. This flow pattern enhances vapor-liquid contact. The improvement of the present invention comprises a sheet of material disposed along the notional plane between the corrugated plates. The sheet includes a plurality of apertures formed therein for effecting the flow of vapor and liquid therealong and within the corrugations of the adjacent plates. The sheet may be constructed with a plurality of relatively small apertures therethrough in conjunction with the relatively large apertures formed therethrough for exposing vapor and liquid contact flow to opposite sides thereof. The aperture formed within the sheets may also be constructed with tab regions bent outwardly therefrom for imparting turbulence to the flow thereover. In this manner, the vapor-liquid interaction can be greatly enhanced and operational efficiency raised well above conventional prior art standards.

In another aspect, the invention includes a vapor-liquid contact structure comprising a stack of corrugated contact plates having orificed and slitted lamella disposed therebetween. The corrugated plates are disposed in face-to-fact contact with respective corrugations inclined to the horizontal and separated one from the other by a sheet. The assembly affords optimal pressure drop characteristics, surficial area, vapor passage area, and vapor-liquid distribution characteristics with maximum efficiency. The sandwiched slitted plate separating adjacent corrugated contact plates greatly increases the mass and heat transfer between the liquid and vapor phases passing thereacross by effectively segregating opposed corrugated channels and establishing a plurality of vapor-liquid contact areas positioned for engaging both vapor and liquid flow in opposed directions through the oppositely inclined corrugations of adjacent plates. In this manner the notional plane is defined between stacks of inclined corrugated contact plates and provided in a configuration providing multiple mass and heat transfer points between adjacent corrugations and flows directed therethrough.

In yet another aspect, the invention includes a method of vapor-liquid contact comprising the steps of providing a process tower having a grid array disposed therein between an ascending vapor flow and a descending liquid flow. The grid array is formed of corrugated contact plates. The method herein includes providing a perforated lamella disposed between adjacent corrugated plates. Liquid is induced to sheet over the lamella and corrugated plates for mass heat exchange. In this manner the vapor-liquid contact is maximized with a minimum of pressure drop.

BRIEF DESCRIPTION OF THE DRAWINGS

For a more complete understanding of the present invention and for further objects and advantages thereof, reference may now be had to the following description taken in conjunction with the accompanying drawing in which.

DETAILED DESCRIPTION

Figure 1:
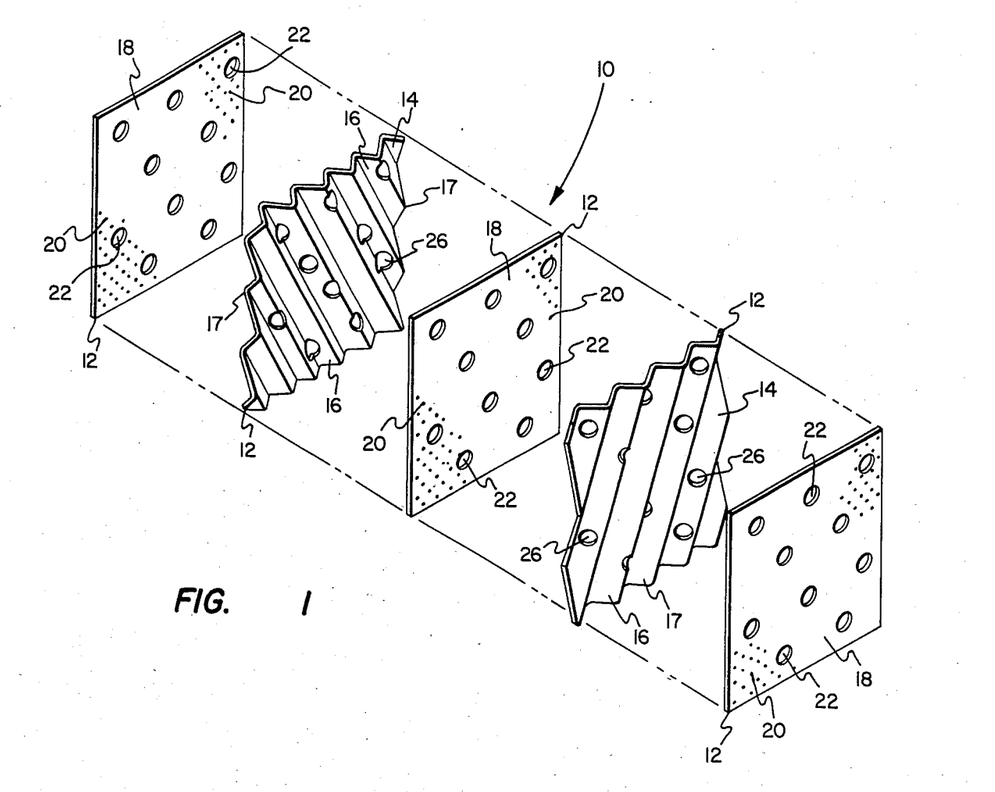
FIG. 1 is an exploded perspective view of one embodiment of the methods and apparatus of the present invention, illustrating a plurality of corrugated plates having sandwiched therebetween apertured lamella defining the interstitial notional plane.

Referring first to FIG. 1 there is shown an exploded perspective view of sections of a contact plate assembly constructed in accordance with the principles of the present invention. The assembly 10 comprises a plurality of plate members 12 formed from stainless steel, or the like, either smooth, perforated, or textured lamella 14, stacked in contiguous face-to-face relationship. Vapor and liquid are induced to flow in opposite directions along and between the plates 14 for effecting mass and heat transfer therebetween. The manner in which the vapor and liquid flow is directed between the respective plates and along the notional plane therebetween directly affects the vapor liquid contact, the efficiency of the operation, and forms the subject of the present invention.

The plates of assembly 10 include crimped or corrugated members 14 having a plurality of flow channels 16 defined within the respective corrugation ridges 17 disposed thereacross and in generally parallel, spaced relationship. The corrugated plates 14 of the present invention are positioned in face-to-face relationship, one to the other with a lamella 18 disposed therebetween. The lamella, or planar sheet 18, disposed between contiguous plates 14 is in contact with adjacent corrugation ridges 17 of respective plates 14. The sheet 18 of the present embodiment further includes a slitted, pierced, or textured surface, which in FIG. 1, includes a plurality of fluid apertures 20 affording patterns of vapor and liquid passages through the sandwiched lamella 18 and adjacent corrugation ridges 17. It should be noted, however, that the apertures 20 could be replaced with bumps or detents and that perforated, textured or smooth plate surface designs are also included within the scope of the present invention. In this manner vapor ascending through the stacked grid assembly 10 and passing through the corrugation channels 16 may be exposed concurrently to the angled sidewall surface areas of the corrugated lamella 14 and to the generally planar, fluid receptive, surface of the intermediate sheet 18. The notional plane between adjacent corrugated plates 14 thus serves as a fluid transfer surface. The apertures 20 formed within the sheet 18 then traps, diverts and, in some embodiments, establish a plurality of thin menisci of liquid during descending fluid flow. The fluid upon the sheet 18 is then exposed on two sides to opposite vapor flow patterns to maximize the efficiency of the mass heat transfer with a minimum of pressure loss and energy input.

Figure 18:
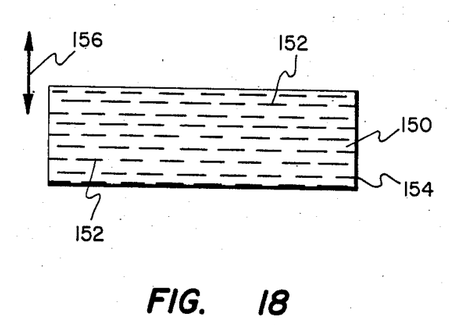
FIG. 18 is a top plan view of a material blank adapted for forming either the corrugated or planar lamella of the present invention and being constructed with a plurality of staggered slits.

Still referring to the embodiment of FIG. 1, the sheet 18 illustrated therein further includes a series of relatively large orifices 22. The orifices 22 are necessary elements of the present lamella construction and afford venting and divert flow between adjacent corrugations channels 16 for vapor pressure equalization. Such vapor pressure considerations are important for preventing maldistribution of flow through the grid assembly 10 under tower operating conditions, to be defined in more detail below. Liquid descending through the grid assembly 10 is optimally spread across the material surface area including the sidewalls of the corrugation channels 16 and the generally planar surface area of the sandwiched lamella. The liquid entrained by the bumps or apertures 20 then comprise a relatively thin liquid volume enhancing exposure and vaporization to the passing vapor flow. This effect maximizes efficiency of the grid operation. The apertures 20 may also be presented in the form of slits, slots, or louvers as shown in FIG. 18 and described below. A plurality of larger apertures 26 are likewise formed within the corrugated plates 14 for concomitant vapor pressure equalization, flow diversion, and enhanced vapor-liquid contact as will be discussed in more detail below.

Figure 2:
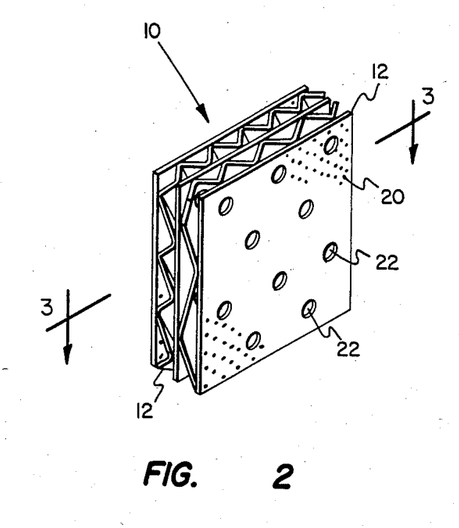
FIG. 2 is perspective view of the vapor-liquid contact grid assembly illustrated in FIG. 1 in an assembled configuration.

Referring now to FIG. 2 there is shown a perspective view of the grid 10 of FIG. 1 in an assembled, "sandwiched" configuration. The grid 10 shown herein comprises only a portion of a grid layer for use in a process tower. It may be seen that the plates 18 separate the adjacent corrugated plates members 14 and are sandwiched therebetween in engagement with the corrugation edge portions 17. A plurality of discrete flow channels 16 are thus formed in the grid 10 as defined by the plate 18 and the contiguous corrugation edge 17. Without the insert plate 18, the corrugated region 16 would be open to the corrugation 16 of the facing plate 14 across the notional plane therebetween. The lamella 18 of the present invention tangibly defines the notional plate and consequently provides a substantial surface for the flow of liquid thereacross. Opposite ones of the corrugated plate members 14 are oriented oppositely one to another for providing an opposed flow of vapor and liquid across the intermediately disposed plates.

Figure 3:
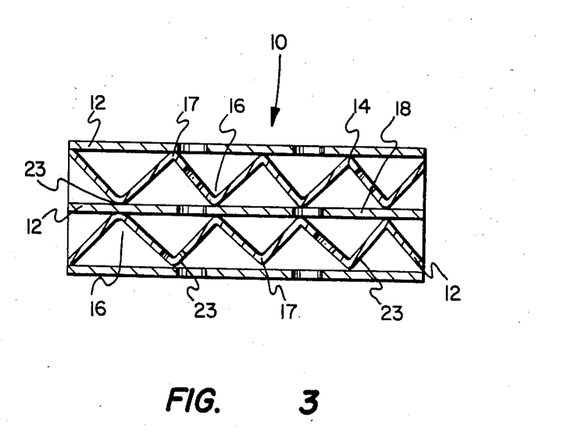
FIG. 3 is an enlarged top plan view of the vapor-liquid contact grid of FIG. 2.

Referring now to FIG. 3 there is shown a top plan view of the assembled grid section 10 of FIG. 2. It may be seen that the lamella 18 discretely separates the adjacent corrugated plates 14. This separation across the notional plane affords defined fluid flow and fluid sheeting along both sides of the plate 18. It may be seen that the area of fluid flow along the notional plane comprises the greatest single wall area defined by a corrugated wall sections 14 formed with an angle of 60° or less. For corrugations 16 formed at an angle greater than 60° the lamella 18 disposed across the notional plane would be of less size than the "V" shaped corrugation side walls. However such a corrugation angle is not frequently incorporated due to the increase in material cost weight and altered process characteristics within a column.

It has thus been found to be most desirable to incorporate corrugations having an angle of formation less than 60° for maximum efficiency in vapor liquid contact. In such configurations the lamella 18 disposed in the notional plane between adjacent corrugated plate members 14 provides not only the maximum wall surface area for each flow channel but further increases the number of connecting flow points within the grid assembly 10. For example, the sheet 18 is sandwiched between adjacent corrugated plates 14 so that the edges 17 of each engage the sheet continuously therealong. This continuous engagement strip affords an elongated series of contact points across which fluid flow can migrate and vapor-fluid contact can be enhanced. Moreover the inner section of the sheet and the corrugation edge 17 form a narrow elongated corner 23. The surface tension of liquid causes the descending fluid to form in the corners 23 along the plate intersections and thus establish a channel of flow that can continuously feed flow to other areas of the sheet 18 and corrugated plates 14. Such feed flow lines along both edges of the corrugation channel 16, as shown in FIG. 3, is highly desirable and may be shown to be an effective way of providing homogeneous liquid flow throughout the grid 10 when constructed in accordance with the present invention.

Still referring to FIG. 3, it may further be seen that the lamella 18 comprises a substantially planar, apertured surface area for the flow of liquid thereacross as compared to the substantially angled side wall regions of the corrugations 16. A more uniform liquid flow is thus provided across the sandwiched sheet than might otherwise be afforded across the curved and inclinded walls of the corrugations. The uniform sheeting action of the flowing liquid is both programmable and a consistent flow aspect of the grid 10. Such sheeting flow may also be characterized as laminar across substantial body portions thereof as compared to the flow across the inclined walls of the corrugated plates 14. Such flow may manifest itself in channeled flow areas of a non-homogeneous or laminar layer across the surface material of the corrugations. With a planar, apertured wall of the sandwiched sheet 18, the flow can both be predicted and programmed for maximum efficiency and vapor liquid contact.

Figure 4:
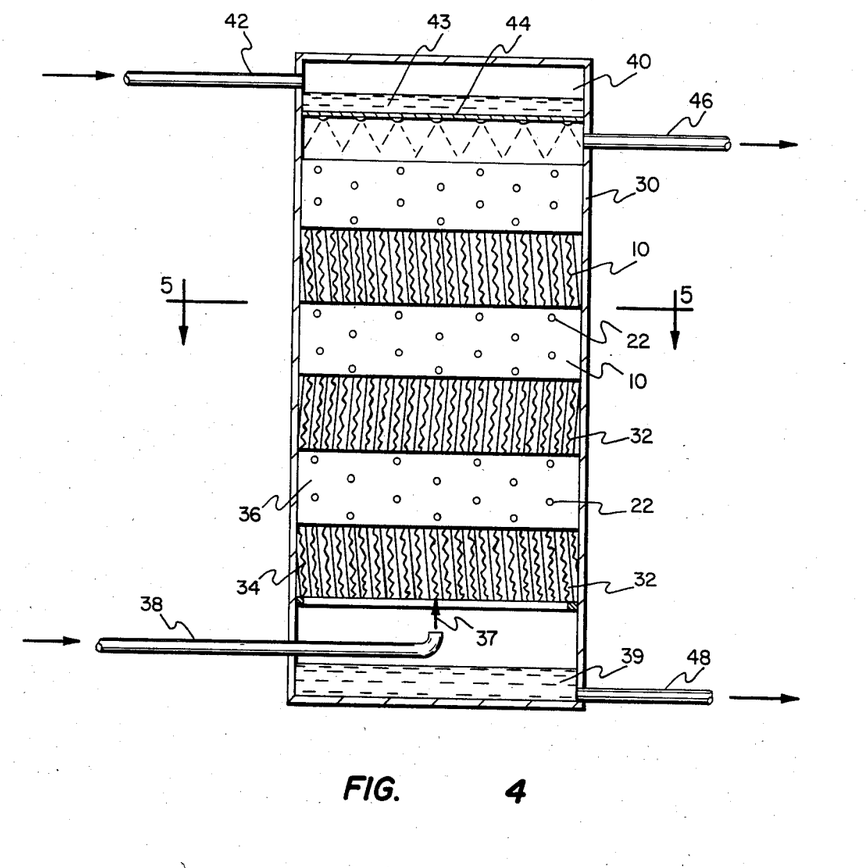
FIG. 4 is a side elevational cross-sectional view of a process tower having stacked therein a plurality of layers of the contact grid illustrated in FIG. 2 and incorporating of one embodiment of the methods and apparatus of the present invention.

Referring now to FIG. 4 there is shown a side-elevational cross-sectional view of a process column 30 with stacked grid arrays 10 constructed in accordance with the principles of the present invention. Grid layers 32 are comprised of a plurality of sandwiched plate sections such as that shown in FIGS. 2 and 3. The outer periphery of the multiple layers is contoured to fit within the process tower 30 which in the present embodiment is circular in cross-section. Adjacent grid layers 32 within the column are preferably oriented orthogonally one to the other to further enhance the vapor liquid contact and turbulence of fluids passing therethrough.

Still referring to FIG. 4, a first grid layer 34 is thus shown adjacent a second, upper grid layer 36 oriented orthogonally to the first whereby the sheet perforations including the orifices 22 and the apertures 20 in the sheets 18 of the layer 36 are illustrated in contrast to the edge portions of the sheet members 18 of said lower grid layer 34. The column is constructed for affording the entry of vapor 37 through a lower vapor flow line 38 positioned near the bottom 39 of the column. The upper region 40 of the tower 30 is likewise fitted with a liquid flow line 42 for affording the ingress of the liquid 43 to be processed within said column. The liquid entry from the fluid flow line 42 is dispersed across the upper grid layer 32 by spray or dispersion heads 44 to initiate homogeneous, descending liquid flow patterns across the stacked grids 10. Similarly, the vapor 37 is introduced in the lower regions 39 of the column for homogeneous distribution therearound and the ascension thereof through the stacked grid layers 32 for heat and-/or mass transfer with the descending liquid 43. The vapor 37 is vented near the top of the column 30 through exhaust line 46 while the excess liquid 43 collected at the bottom 39 of said column is permitted to drain through line 48. The technique of such column operation is well known in the prior art and is, for example, set forth and shown in U.S. Pat. Nos. 3,959,419 and 3,969,447, both of which are assigned to the assignee of the present invention.

Figure 5:
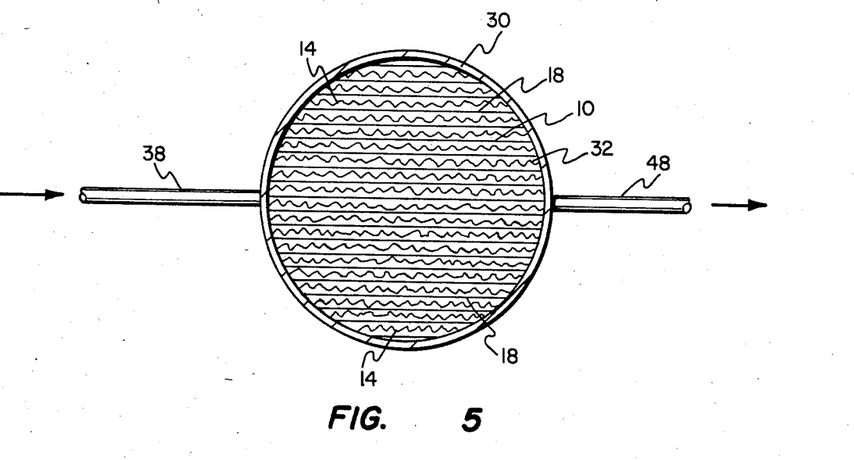
FIG. 5 is a top plan cross-sectional view of the process tower of the process tower of FIG. 4 taken along lines 5—5 thereof.

Referring now to FIG. 5 there is shown a top plan view of the column of FIG. 4 taken along line 5—5 thereof. The flow line 38 and 48 are shown in conjunction with the assembled grid layers. The grid layer 32 is shown in cross-section and comprises a circular body having a plurality of stacked plates 14 and sheets 17 in face to face engagement thereacross. The construction and assembly considerations for conventional column packing grids and the operation thereof is a well known technology of the prior art. The present invention, however, comprises a grid 10 which goes beyond the prior art approaches to counterflow method and apparatus for vapor-liquid contact for enhanced operation. For example, the lamella 18 may be constructed of slitted or expanded metal as shown in more detail below. Moreover, the corrugated plates 14 may also be constructed if expanded metal or the like which greatly enhances vapor-liquid contact in the manner set forth in more detail below.

Figure 6:
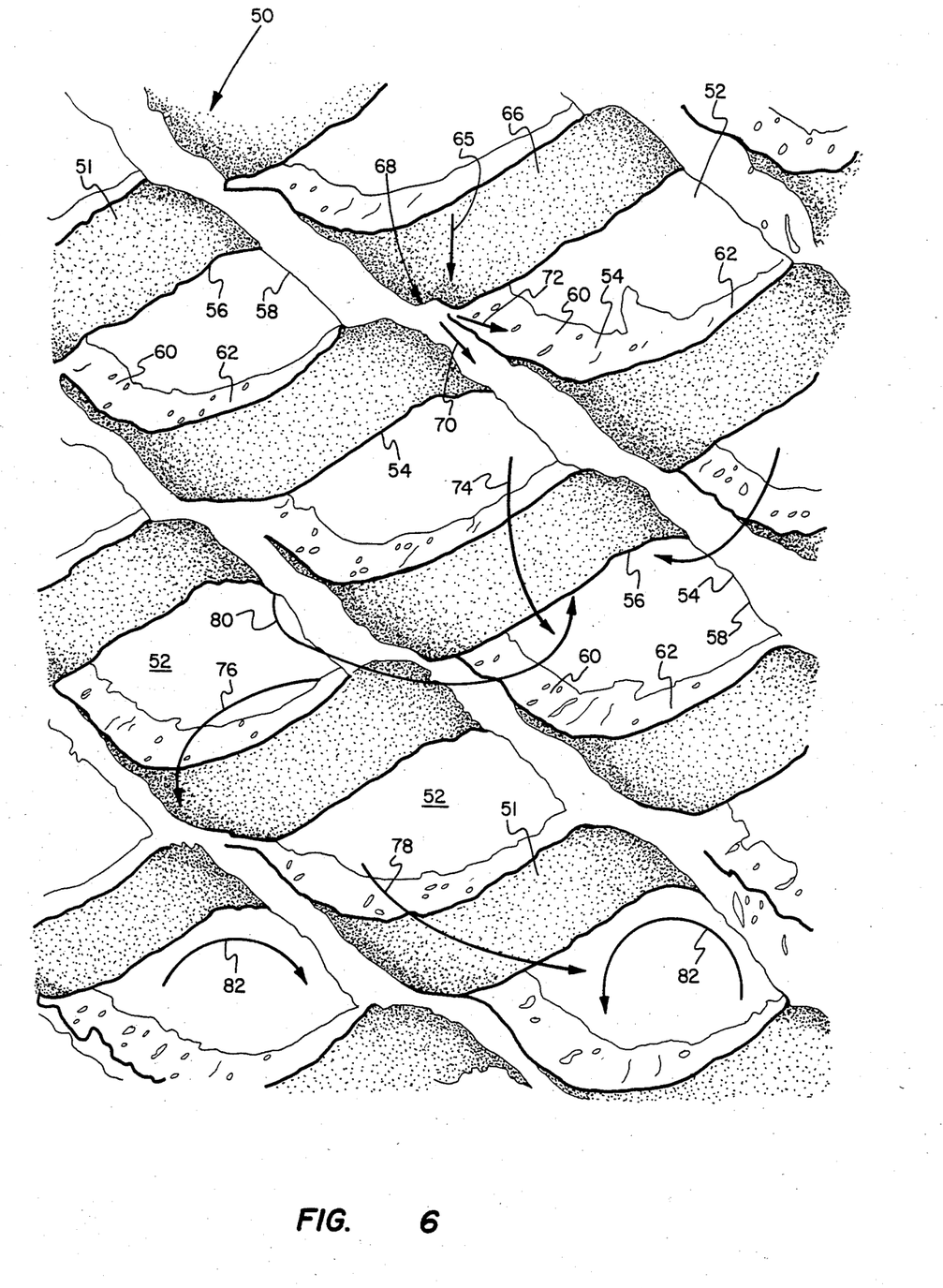
FIG. 6 is an enlarged fragmentary, front elevational view of an expanded metal lattice comprising a portion of one embodiment of a contact plate of the present invention and illustrating the interrelated flow network therein.

Referring now to FIG. 6, there is shown an enlarged front elevational fragmentary view of an alternative embodiment of the corrugated flow plate 14. The plate 14 shown herein is formed of expanded metal 15 shown in a greatly magnified view which illustrated the liquid flow patterns which occur thereacross. Full disclosure of the subject expanded metal plate is set forth in copending patent application Ser. No. 725,143 filed on even date herewith and assigned to the assignee of the present invention. The expanded metal body or lattice 50 of the expanded metal plate is comprised of an interconnected series of twisted and deformed lands 51 defining generally rectangular apertures 52 therebetween. Each twisted land 51 is comprised of four elongated side wall surfaces 54. The four surfaces 54 are bent and twisted during plate formation to afford an interconnected liquid flow path of varying degrees of angulation and inclination relative to the generally vertical fluid flow of the vapor. The twisted land portions are also capable of carrying fluid and vapor flow from one side of the corrugated plate 14 to the other during vapor fluid flow thereacross.

The sidewall surfaces 54 of the expanded metal lattice 50 each comprise a first upper face 56, a second lateral face 58, a first bottom side face 60 and a bottom face 62. The various surfaces 54 are shown most clearly in FIG. 6 and as generally rough and pitted due to the method of formation. The faces 56, 58, 60 and 62 are curved and twisted both into and away from the opposite sidewalls of the plate 14 whereby fluid flowing therealong is diverted onto various ones of the flow faces and, in some instances, transferred to the opposite side of the lattice 50. Because the surface is made of metal, wetting is facilitated and laminar fluid filming thereacross is enhanced by the twisted fluid flow path over the surfaces of each of the angled lands 51. The curved and jagged formation of land faces 56, 58, 60 and 62 further serves to disturb laminar vapor flow across the plate 14 for imparting turbulence thereto and exposing the descending liquid flow to the turbulent vapor for improved mixing.

Still referring to FIG. 6, there is shown a typical flow pattern designated by arrows 65 whereby the flow of descending liquid 43 may be viewed relative to the flow path of ascending vapor 37. A typical flow pattern of descending liquid 43 brings it down a first land 66 where it is separated along an interface 68 between side land 69, along arrow 70, and bottom face 60 (along arrow 72). The liquid 43 flows in a film across both surfaces and may be carried to the opposite side of the lattice 50. This is one of a myriad of flow patterns. The fluid flowing along the lands 51 intersects and merges with the flow from adjacent land areas 51 from the opposite side of the lattice 50, and from the myriad of surfaces 54 of apertures 52. The flow patterns can thus form swirls of liquid flow as shown by arrows 74, 76 and 78. The swirls of arrows 74 and 78 indicate liquid circulating around lands 51, which flow is "pseudo turbulent" relative to the vapor flow and highly advantageous for effective vapor-liquid contact.

Still referring to FIG. 6, the pitted and jagged metal surface areas are typical of expanded metal which is deformed beyond its point of elastic deformation to take a plastic set in the select expanded and corrugated configuration. The jagged edges may be seen to impart turbulence to both the countercurrent vapor and liquid flow patterns. In this manner, maximum heat-mass transfer through the vapor-liquid flow is effected. Vapor turbulence also effects the liquid flow and another flow pattern of circular flow 80 around the lands of adjacent apertures 52 may be established. Circular liquid or vapor flow may also be created in the pattern of arrows 82 due to the turbulence and flow channeling features of the expanded metal lattice 50 which, in conjunction with its angulation relative to an adjacent corrugated lattice, affords directionality to the ascending vapor 37. This condition creates circulating vapor and/or liquid flow regions passing between adjacent apertures 52. Such circular flow comprises maximum turbulence and greatly facilitates mass transfer. Vaporization of the descending liquid in any particular area is readily replenished from the convoluted, interconnected flow patterns afforded in the present invention. This aspect, in conjunction with the wetting parameters of the metal, greatly enhances the operational characteristics of the present invention. Moreover, the expanded metal is capable of relieving residual stress during formation to reduce the propensity of corrosion often found in cold formed metal packing elements of conventional prior art designs. Residual stress is a known factor of corrosion when such metal bodies are exposed to many of the standard corrosive chemicals commonly utilized in fractionation processes in such stacking columns.

Figure 7:
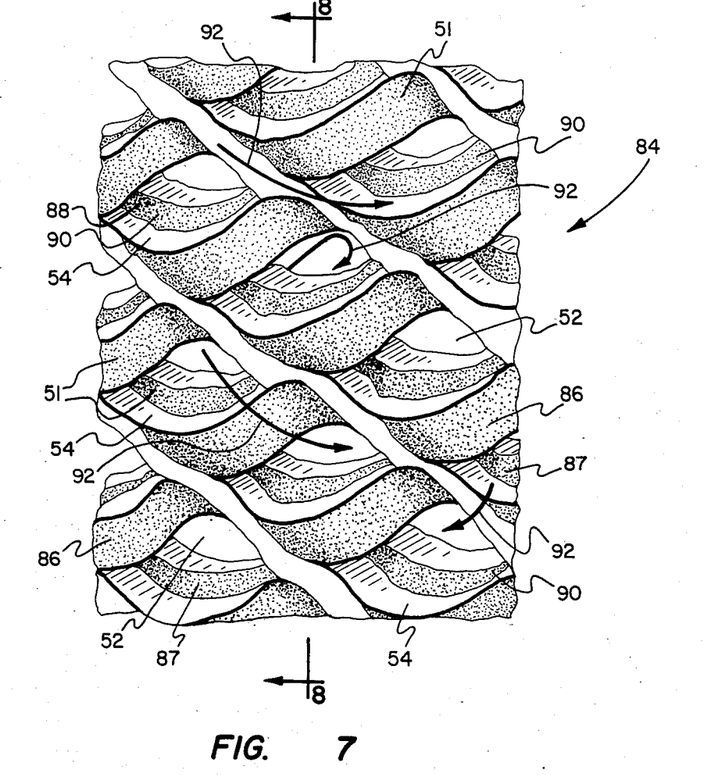
FIG. 7 is an enlarged, fragmentary front-elevational view of an alternative embodiment of the expanded metal lattice of FIG. 6.

Referring now to FIG. 7, there is shown an alternative embodiment of an expanded metal corrugated lattice 50 constructed in accordance with the principles of the present invention. Lattice 84 is constructed from a pair of expanded metal blanks 86 and 87 laminated one to the other whereby the sidewall configuration of the resulting aperture 52 includes an offset wall region 88 with an abutment channel 90 formed therearound. The channel 90 is comprised of the intersection of the sidewalls 54 and land 51 of the respective expanded metal laminants 86 and 87. The channel 90 traps liquid 43 flowing therearound through capillary action or the like. The entrained liquid 43 within the laminate wall region 90 affords numerous advantages in vapor-liquid contact by presenting a liquid surface integral with the expanded metal plate, which liquid is actually retained by capillary action. The corrugation formation of the plate 84 further deforms and offsets the wall region due to natural expansion properties. This deformation further enhances the entrainment channel configuration. Sheets of slitted or slotted metal expanded into the plate configuration shown herein will thus provide vastly improved liquid entrainment properties, which entrainment may be seen to be typical of the entire land region 51 surrounding the expanded metal apertures 52. In this manner, a sheet of expanded metal, as set forth herein, may be seen to present a dual face of filmed over and entrapped liquid. The liquid exposure may be seen to be of a degree not heretofore possible. The amount of liquid entrainment is, in essence, a complete magnitude greater than conventional corrugated plates incorporating simple aperture formation for flow enhancement. In this manner, the ascending vapor flow, countercurrent to the liquid flow, is literally channeled into "pseudo turbulent" flow patterns by the offset presence of the liquid 43 about the twisted lattice 84 comprising the integral sections of the expanded metal grid. This feature greatly promotes the critical mass-head interchange between the vapor and liquid in the process tower.

Still referring to FIG. 7, it may be seen that the twisted lattice 84 likewise affords multiple flow paths for descending liquid. It may be seen again by way of arrows 92 illustrating the descending liquid flow that the fluid is likewise channeled into, through and around the sidewalls and upper edges 54 of the various expanded lattice apertures 52. Vapor 37 is likewise diverted into the edges of the apertures 52 where liquid 43 is entrained in the sidewall channels 90 of the adjacent laminates.

Figure 8:
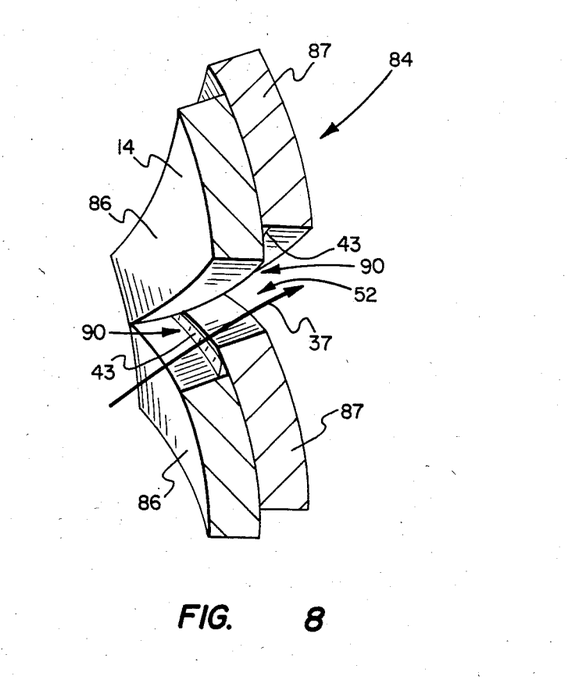
FIG. 8 is a side-elevational, cross-sectional, fragmentary view of a portion of the expanded metal lattice of FIG. 7 illustrating the laminate construction thereof.

Referring now to FIG. 8, there is shown a fragmentary side elevational view of an enlarged aperture section 52 with upper and lower channels 90 clearly shown. Laminate plates 86 and 87 are offset one to the other from the expansion during formation. Liquid 43 is shown entrained within upper and lower channels 90. Vapor 37 passing over the plate 14 may even pass through the aperture 52 to contact the liquid entrained therein. Even when vapor 37 does not pass through the aperture 52, the presence of entrained liquid 43 enhances the flow of descending liquid thereover and through the lattice 84 to effect the flow patterns discussed above. Such "pseudo turbulent" flow patterns and fluid presence are integral to maximum vapor-liquid contact efficiency.

Referring now to FIGS. 9 through 17 collectively, there are shown various embodiments of the aperture and/or tab construction formed in the corrugated plates 14 or notional plane lamella 18. It should be understood that the plates or lamella shown in FIGS. 9 through 17 may be constructed of either solid, smooth, textured, slitted, louvered, or expanded metal configurations although solid configurations are shown in each of the drawings for purposes of clarity.

Figure 9:
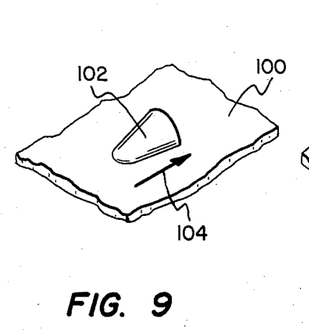
FIG. 9 through FIG. 17 are alternative embodiments of sidewall flow apertures formed in the sidewall of the lamella of the present invention adapted for imparting turbulence to the vapor-liquid flow passing thereover.
Figure 10:
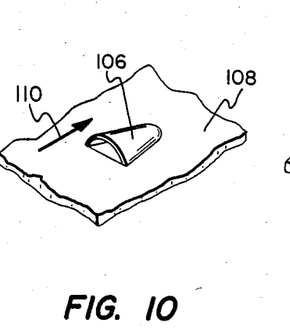

Addressing first the slotted configuration of FIG. 9, there is shown a plate section 100 having a tabbed aperture 102 formed therein and oriented relative to the direction of fluid flow shown by arrow 104. The tabbed aperture of FIG. 9 is comprised of a slitted and coined portion which protrudes outwardly from the plane of the plate 100 in a semi-conical configuration for diverting the flow of vapor and liquid and imparting turbulence to the flow. Similarly, FIG. 10 is shown comprising a tabbed aperture 106 upon a lamella section 108 with the direction of fluid flow shown by arrow 110. It may be seen that fluid flowing in the direction 110 will be received into the tabbed aperture 106 and channeled therethrough into the opposite side of the lamella 108. Likewise, the various tabbed apertures shown herein may be provided upon either the corrugated plates 14 of the present invention or upon the insert lamella 18. In these various tab structure configurations, the fluid flow parameters and operational characteristics may be selectively altered for precise flow characteristics and the particular constituents used within a process column 30. For this reason a variety of tabbed apertures are shown herein illustrating the varieties of fluid flow and turbulence which may be generated.

Figure 11:
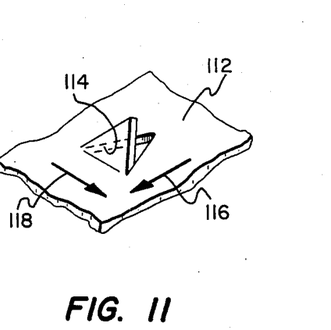
Figure 12:
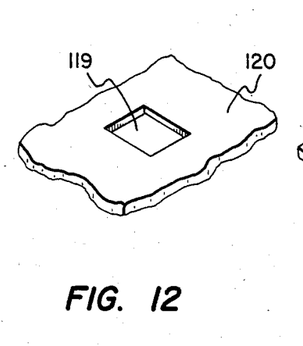
Figure 13:
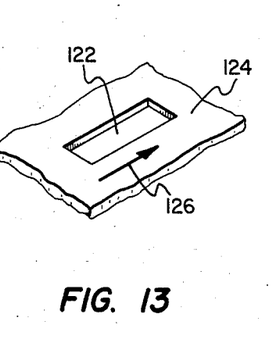
Figure 14:
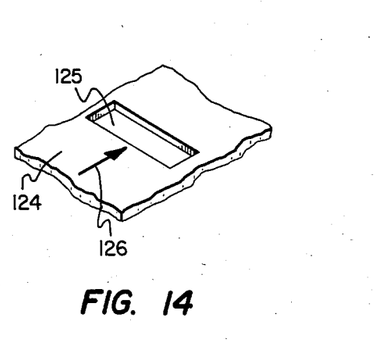

Referring now to FIG. 11 there is shown a plate 112 having a triangular, tabbed aperture 114 formed thereon. Fluid flow in the direction shown by arrow 116 will be received within the triangular tabbed aperture while flow laterally thereto, in the direction show by arrow 118, may be partially diverted and partially received within the aperture. Likewise FIG. 12 illustrates a generally square aperture formed without a tabular region within a plate 120. The square aperture 119 has various fluid flow diverting characteristics contrasting that of a circular aperture and that of a aperture having a tabbed region upstanding therefrom. FIG. 13 illustrates a rectangular aperture positioned longitudinally to the direction of flow. The rectangular aperture 122 formed upon plate 124 is oriented for diverting longitudinal flow as shown by arrow 126. In this configuration, flow is substantially diverted and that which proceeds into the aperture may be carried to the opposite side of the plate 124. The advantages of such cross fertilization from one side to the other side of the flow plates has been set forth above. Addressing now FIG. 14, the plate 124 is shown with a rectangular aperture 125 of equivalent size to that shown in FIG. 13 but oriented generally orthogonal thereto for imparting a substantially different fluid flow effect to a fluid flow propogating in the direction of arrow 126.

Figure 15:
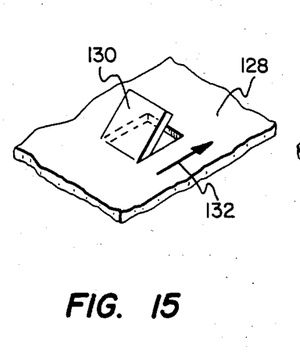

Referring now to FIG. 15 there is shown a plate 128 having a generally rectantular tabbed aperture 130 formed therein. Fluid flowing in a first direction 132 may be seen to be diverted substantially by said tabbed aperture 130 as shown in FIG. 11. However, again the fluid diverting affects are considered in conjunction with the fluid circulating effects for fluid received through the aperture into the opposite side of the plate 128.

Figure 16:
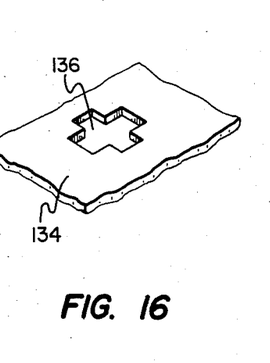
Figure 17:
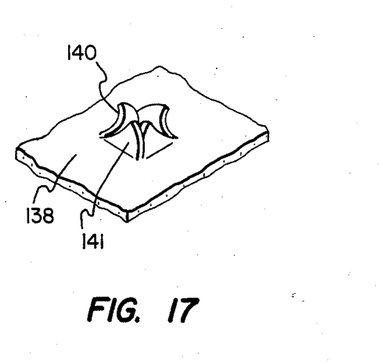

Referring now to FIG. 16 there is shown a plate 134 having a cross shaped aperture 136 received therein. The aperture 136 is capable of diverting various directions of fluid flow much like a circular aperture but with the capability of retaining various fluid accumulations along the corners thereof. Finally, addressing FIG. 17 there is shown a plate section 138 having a tabbed aperture 140 comprised of a plurality of flanged regions 141 folded outwardly of the tabbed 140 for substantially diverting and preventing the transfer of liquid therethrough but permitting the passage of vapor. Such an aperture may be advantageous for certain vapor liquid and/or mass heat exchange characteristics desired for select chemical reactions in a process column.

Referring now to FIG. 18 there is shown a top plan view of a material blank comprised of slit construction and adapted for utilization in the present invention as either the plate 14 or lamella 18. The slitted construction includes a plurality of elongate slits or louvers 152 formed in parallel rows and which are in longitudinal spaced relationship one to the other the slits 152 in adjacent rows are offset and staggered one to the other along a longitudinal direction into alignment with spaced between the slits for affording a laminar fluid flow when disposed in a vertical configuration. The plate 150 of FIG. 18 includes slits or louvers 152 which are formed through solid surfaces of the sheet 150 in rows 154 which are generally in parallel spaced relationship and which may be expanded through stretching in the direction of arrow 156. The material may also be provided in a slit or slotted configuration for use as a lamella 18 to be disposed within the notional plane between adjacent and corregated plates 14. Likewise the configuration shown in FIG. 18 may be used in the embodiment shown therein as a plate construction for the corrugated assembly of plate 14. The slits or slots 152 formed therein may be seen to provide various advantages capillary effects and lateral entrainment of the liquid descending thereacross for purposes of vapor liquid interface reaction.

Figure 19:
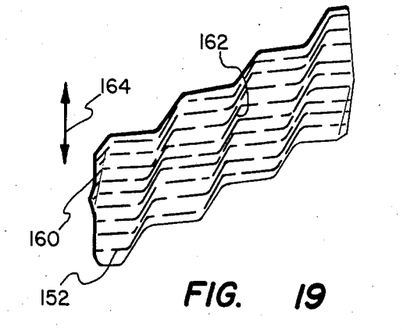
FIG. 19 is a perspective view of an alternative embodiment of the expanded metal, corrugated lamella of the present invention comprising a non-expanded slitted metal blank.

Referring now to FIG. 19 the material blank of FIG. 18 is shown in a crimped and/or corrugated configuration. The slits 152 of the corrugated plate 160 shown in FIG. 19 extend transversely across a plurality of corrugations of 162 and are capable of diverting fluid flow or the construction of expanded corrugated plates by vertical expansion in the direction of arrow 164. It is conventional in the prior art to expand metal by first slitting and/or slotting said metal by forming and/or coining and then expanding said metal. Various steps in the coining, expanding, slitting and slotting processing steps may be altered for a particular flow configuration. As set forth above, the particular twisted and turned land configuration resulting from slitting and slotting has various advantages heretofore unavailable in prior art configurations for vapor liquid contact towers.

Figure 20:
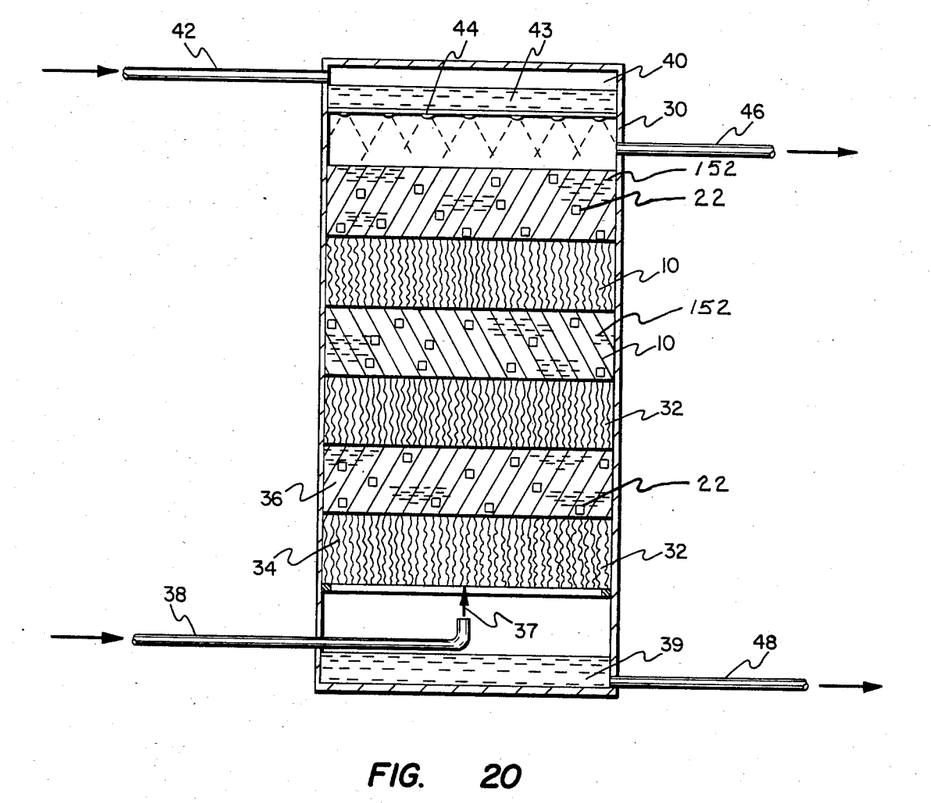
FIG. 20 is a side-elevational, cross-sectional view of a process tower having installed therein a plurality of grid layers constructed from one embodiment of the corrugated contact plates of the present invention and illustrating a plurality of rectangular flow aperatures formed therethrough in accordance with the principles of the present invention.

Referring now to FIG. 20 there is shown a process column 30 having the equivalent input and output vapor and liquid process lines as set forth above for the processing of ascending vapor with counter-current descending liquid flow therethrough. The process column 30 is shown with a plurality of packing element assemblies 10 comprising grid layers 32 having the angulated corrugated plates 14 disposed therein with rectangular orifices 22 and elongate slits 152 shown through said corrugated plates for purposes of illustration. It may be seen that the rectangular orifices 22 are shown disposed in similar position to the circular orifices 22 set forth above in FIG. 4 and the elongate transversely extending slits 152 are disposed similar to the apertures 20 . However, the flow characteristics and chemical reactions concomitantly provided by such variations and process tower construction and flow characteristics may be shown to enhance the specific vapor liquid contact parameters necessary for select chemical reactions. Likewise the orientation of the tabular aperture configurations shown in FIGS. 9 through 17 have been shown to be particularly useful in "tuning" a process tower corrugated plate and/or lamella configuration for specific vapor liquid contact operation. By utilizing these parameters and the teachings of the present invention, the process tower of the prior art may be utilized in an enhanced and much efficient configuration whereby specific flow configurations and turbulence levels may be interfaced with known laminar boundary characteristics for a particular grid array. With such flow characteristics and the developed parameters for the various tabular orientations relative to the corrugated expanded metal and/or plate materials incorporated into process tower, numerous advantages may be experienced with regard to operational environments.

It is thus believed that the operation and construction of the present invention will be apparent from the foregoing description. While the method and apparatus shown and described has been characterized as being preferred it will be obvious that various changes and modifications may be made therein without departing from the spirit and scope of the invention as defined in the following claims.

I claim:

1. An improved tower packing of the type comprising a plurality of corrugated metal sheets in face-to-face contact with opposed corrugations inclined oppositely one to the other for receiving a descending liquid flow concomitantly with an ascending vapor flow to bring about vapor-liquid contact therebetween for mass and-/or heat transfer, said corrugated sheets being formed with a plurality of orifices for affecting the flow of vapor and liquid therealong and within the corrugations of adjacent sheets, wherein the improvement comprises a planar unexpanded metal sheet of material disposed along the notional plane between said corrugated sheets, said planar unexpanded metal sheet including a plurality of apertures formed therein for affecting the flow of vapor and liquid therealong and within the corrugations of said adjacent sheets, a portion of said apertures being a plurality of relatively small spaced apart slits formed through solid surfaces of each sheet and another portion of said apertures being relatively large orifices spaced apart by said solid surfaces for enabling vapor and liquid to flow to opposite sides of said sheets, said slits being uniformly distributed, elongated, and their longitudinal axes extending transversely to the corrugations, the total area of all of said slits being smaller than the total area of said solid surfaces, each of said spaced apart slits being formed in said metal sheet with relatively small tab regions comprising twisted land areas bent outwardly therefrom.

2. The improvement as set forth in claim 1 wherein said small, elongated, transversely extending slits are formed in said sheet longitudinally spaced from one another in generally parallel rows.

3. The improvement as set forth in claim 2 wherein said slits are formed with the slits in adjacent rows being longitudinally offset from one another into alignment with the spaces between the adjacent slits in a staggered array configuration.

4. The improvement as set forth in claim 1 wherein said opposed corrugations are inclined generally orthogonally one to the other with said apertured sheet disposed therebetween and said elongated slits extend perpendicular to the axis of the column.

5. The improvement as set forth in claim 1 wherein said elongated slits extend perpendicular to the axis of the column.

6. The improvement as set forth in claim 1 wherein each of said elongated slits includes a coined portion protruding outwardly from the plane of said planar sheet and extending from said slit in the direction of liquid flow along said sheet.

7. The improvement as set forth in claim 6 wherein said elongated slits are formed in said planar sheet longitudinally spaced from one another in generally parallel rows.

8. The improvement as set forth in claim 7 wherein the coined portions of the slits in alternate rows protrude outwardly from the plane of said planar sheet in opposite directions.

9. An improved method of improving vapor liquid contact within a process tower of the type comprising the steps of providing a generally vertical tower having means for ingressing the flow of vapor at the lower region thereof and means for ingressing a stream of liquid at the upper region thereof and a series of layers of grid sections comprising generally vertical oriented corrugated sheets of unexpanded material with the corrugations of adjacent sheets being inclined one to the other between said liquid and vapor ingressing means for receiving the descending flow of liquid and the ascending flow of vapor concomitantly therethrough for the thorough mass and/or heat transfer therebetween, said improvement comprising the steps of providing said corrugated sheets with a plurality of parallel, elongate, spaced apart slits formed through solid surfaces of each sheet with the total area of all of said slits being smaller than the total area of said solid surfaces, providing said slitted sheets with a plurality of relatively larger apertures spaced apart by said solid surfaces for effecting the flow of vapor and liquid therealong and within the corrugations of said adjacent sheets for enhancing the vapor liquid interaction, and the further step of orienting the longitudinal axes of said elongate slits in said sheets to extend generally transversely to said vapor liquid flow and said corrugations for imparting turbulence thereto along with a transverse spreading to the liquid flowing down and through said sheets, and the further step of inserting a perforated planar sheet along the notional plane between said corrugated sheets, said perforated sheet including a plurality of relatively larger orifices spaced apart by solid surfaces for effecting the flow of vapor and liquid therealong and within the corrugations and elongate slits of said adjacent sheets for enhancing the vapor liquid interaction flowing therethrough and substantially segregating the vapor and liquid flow of respective corrugated channels one from the other.

10. The method as set forth in claim 9 wherein said method further includes providing said perforated planar sheet with a plurality of parallel, elongate, spaced apart slits formed through solid surfaces of each sheet.

11. A tower packing comprising a plurality of sheets of unexpanded material, a plurality of corrugations formed on each sheet, said sheets being disposed in face-to-face contact with the corrugations of each sheet extending at an angle to the corrugations of its adjacent sheets to define flow paths for a descending liquid and an ascending vapor, a planar sheet of unexpanded material disposed along the notional plane between said corrugated sheets, a plurality of relatively large orifices formed through and spaced apart by solid surfaces of each planar sheet for permitting passage of said liquid and vapor therethrough to distribute the liquid over said sheets and equalize the pressure of said vapor, and a plurality of relatively small elongated slits formed through the solid surfaces of each of said planar sheets, the slits in each sheet being spaced longitudinally from each other in parallel rows with the longitudinal axes of said slits extending transversely across said corrugations, the total area of all of said slits being smaller than the total area of said solid surfaces, a portion of each sheet adjacent each slit being displaced from the plane of said sheet, to enhance vapor-liquid contact along said sheets.

12. The apparatus as set forth in claim 11 wherein said slits include a coined portion protruding outwardly from the plane of said sheet and extending from said sheet in the direction of liquid flow along said sheet.

13. The apparatus as set forth in claim 12 wherein the coined portion of the slits in alternate rows protrude outwardly from the plane of said sheet in opposite directions.

14. The apparatus as set forth in claim 11 wherein said slits include a coined portion protruding outwardly from the plane of said sheet and extending from said sheet in a direction opposite to the direction of liquid flow along said sheet.

* * * * *